(12) United States Patent
Matsuoka

(10) Patent No.: US 11,434,979 B2
(45) Date of Patent: Sep. 6, 2022

(54) DRIVE UNIT

(71) Applicant: EXEDY Corporation, Neyagawa (JP)

(72) Inventor: Yoshihiro Matsuoka, Neyagawa (JP)

(73) Assignee: EXEDY CORPORATION, Neyagawa (JP)

(*) Notice: Subject to any disclaimer, the term of this patent is extended or adjusted under 35 U.S.C. 154(b) by 180 days.

(21) Appl. No.: 16/906,521

(22) Filed: Jun. 19, 2020

(65) Prior Publication Data
US 2021/0018068 A1 Jan. 21, 2021

(30) Foreign Application Priority Data
Jul. 16, 2019 (JP) .............................. JP2019-130896

(51) Int. Cl.
F16H 3/089 (2006.01)
F16H 47/06 (2006.01)

(52) U.S. Cl.
CPC .............. F16H 3/089 (2013.01); F16H 47/06 (2013.01)

(58) Field of Classification Search
CPC .................................. F16H 3/089; F16H 47/06
USPC ........................................................ 74/730.1
See application file for complete search history.

(56) References Cited

U.S. PATENT DOCUMENTS

| | | | | |
|---|---|---|---|---|
| 4,982,623 A * | 1/1991 | Yoshino | .............. | F16H 61/0213 477/94 |
| 8,297,141 B2 * | 10/2012 | Cimatti | ............... | F16H 57/0439 74/330 |
| 9,878,706 B2 * | 1/2018 | Frait | ..................... | B60W 10/02 |
| 10,471,820 B2 * | 11/2019 | Lahr | ........................ | B60K 6/40 |
| 2013/0087425 A1 | 4/2013 | Frait et al. | | |
| 2013/0088109 A1 * | 4/2013 | Frait | ........................ | B60K 6/40 310/90 |

FOREIGN PATENT DOCUMENTS

| | | |
|---|---|---|
| DE | 102019114902 A1 | 3/2020 |
| FR | 2434960 A1 | 3/1980 |
| JP | 2001-287556 A | 10/2001 |
| JP | 5370233 B2 | 12/2013 |

OTHER PUBLICATIONS

Extended European Search Report of the corresponding European Application No. 20180196.6, dated Nov. 19, 2020, 20 pp.

* cited by examiner

Primary Examiner — Ha Dinh Ho
(74) Attorney, Agent, or Firm — United IP Counselors, LLC

(57) ABSTRACT

A drive unit for driving a drive wheel is disclosed. The drive unit includes a motor, a torque converter and a power output part. The torque converter is a component to which a power is inputted from the motor. The power output part outputs the power, inputted thereto from the torque converter, to the drive wheel. The power output part includes a first gear train and a second gear train. The first gear train outputs the power, inputted to the power output part from the torque converter, in a first rotational direction. The second gear train outputs the power, inputted to the power output part from the torque converter, in a second rotational direction reverse to the first rotational direction.

6 Claims, 10 Drawing Sheets

DRIVE UNIT

CROSS-REFERENCE TO RELATED APPLICATIONS

This application claims priority to Japanese Patent Application No. 2019-130896, filed Jul. 16, 2019. The contents of that application are incorporated by reference herein in their entirety.

TECHNICAL FIELD

The present invention relates to a drive unit.

BACKGROUND ART

Electric cars travel using a motor as a drive source. The electric cars move forward by forwardly rotating the motor and move backward by reversely rotating the motor. There has been proposed a type of electric car in which a torque converter is installed in order to amplify a torque outputted from the motor (e.g., Publication of Japan Patent No. 5370233).

In such an electric car including the torque converter as described above, the torque converter is rotated in similar manner to the motor. Because of this, when the motor is forwardly rotated in forward movement, the torque converter is forwardly rotated as well. On the other hand, when the motor is reversely rotated in backward movement, the torque converter is reversely rotated as well. Now, the torque converter exerts a function of amplifying a torque when forwardly rotated. However, the torque converter significantly degrades in function of amplifying a torque when reversely rotated. Because of this, such an electric car as described above has a drawback that a driving force degrades in backward movement. In view of this, it is an object of the present invention to provide a drive unit whereby a torque can be amplified not only in forward movement but also in backward movement.

BRIEF SUMMARY

A drive unit according to an aspect of the present invention is a drive unit for driving a drive wheel. The drive unit includes a motor, a torque converter and a power output part. The torque converter is a component to which a power is inputted from the motor. The power output part outputs the power, inputted thereto from the torque converter, to the drive wheel. The power output part includes a first gear train and a second gear train. The first gear train outputs the power, inputted to the power output part from the torque converter, in a first rotational direction. The second gear train outputs the power, inputted to the power output part from the torque converter, in a second rotational direction reverse to the first rotational direction.

According to the configuration, the power inputted to the torque converter is outputted to the drive wheel through the power output part. In the power output part, the first gear train outputs the power in the first rotational direction, whereas the second gear train outputs the power in the second rotational direction. Because of this, a vehicle can be moved forward when the power output part outputs the power through the first gear train while the motor is forwardly rotated. By contrast, the vehicle can be moved backward when the power output parts outputs the power through the second gear train while the rotational direction of the motor is kept unchanged. Thus, the vehicle can be moved backward, while the motor is forwardly rotated. As a result, the torque converter is forwardly rotated in backward movement as well. Hence, the torque converter is enabled to exert a torque amplifying function. Therefore, the drive unit according to the present invention can amplify a torque not only in forward movement but also in backward movement.

Preferably, the first gear train has a different gear ratio from the second gear train. For example, the first gear train has a lower gear ratio than the second gear train. Alternatively, the first gear train has a higher gear ratio than the second gear train.

Preferably, the power output part is enabled to be set to one of a first output mode, a second output mode and a neutral mode. The power output part outputs the power through the first gear train in the first output mode. The power output part outputs the power through the second gear train in the second output mode. The power output part is prevented from outputting the power inputted thereto from the torque converter in the neutral mode. When the power output part is set to the neutral mode, the vehicle can be easily drawn. Besides, when the power output part is set to the neutral mode, it is possible to reduce a load acting on the motor in driving an oil pump.

Preferably, the drive unit further includes a switch mechanism. The switch mechanism is configured to switch the power output part from one to another among the first output mode, the second output mode and the neutral mode.

Preferably, the drive unit further includes an oil pump. The oil pump is unitarily rotated with either the motor or the torque converter. Preferably, the oil pump is unitarily rotated with an impeller of the torque converter. According to the configuration, the rotational direction of the oil pump remains unchanged regardless of forward movement and backward movement of the vehicle. Because of this, malfunction of the oil pump and so forth can be inhibited.

Overall, according to the present invention, a torque can be amplified not only in forward movement but also in backward movement.

DETAILED DESCRIPTION

Figure 1:
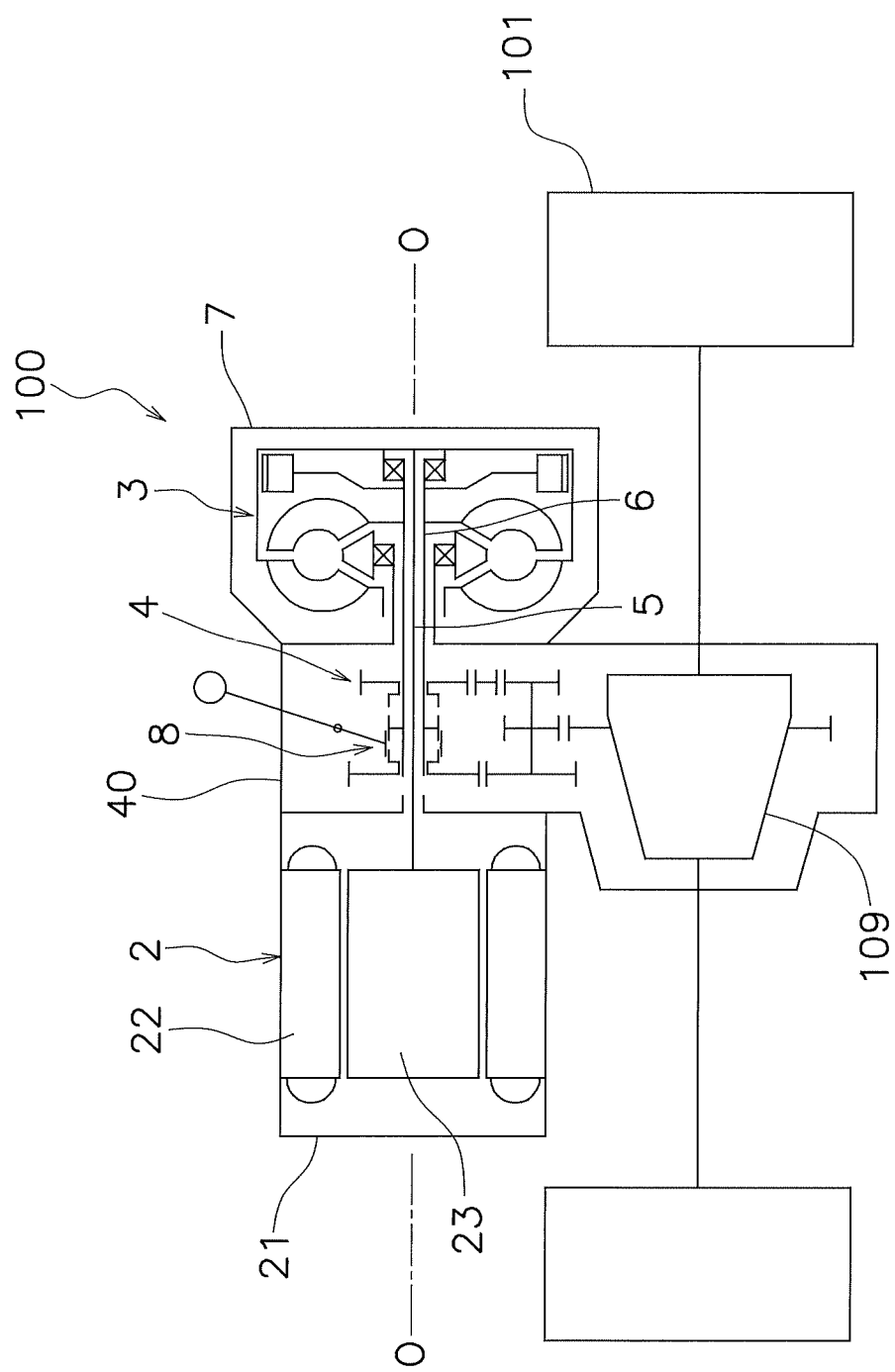
FIG. 1 is a schematic diagram of a drive unit.

A preferred embodiment of a drive unit according to the present invention will be hereinafter explained with reference to drawings. FIG. 1 is a schematic diagram of the drive unit according to the present preferred embodiment. It should be noted that in the following explanation, the term "axial direction" refers to an extending direction of a rotational axis O of a motor 2 and a torque converter 3. On the other hand, the term "circumferential direction" refers to a circumferential direction of an imaginary circle about the rotational axis O, whereas the term "radial direction" refers to a radial direction of the imaginary circle about the rotational axis O.

[Drive Unit 100]

As shown in FIG. 1, a drive unit 100 is a unit for driving drive wheels 101. The drive unit 100 includes the motor 2, the torque converter 3, a power output part 4, a switch mechanism 8, an input shaft 5, an output shaft 6, a torque converter casing 7 and a first cooling flow pathway 9a (see FIG. 8). The drive unit 100 is installed in, for instance, an electric car.

<Motor 2>

The motor 2 includes a motor casing 21, a stator 22 and a rotor 23. In the present preferred embodiment, the motor 2 is a so-called inner rotor motor. The motor casing 21 is fixed to a vehicle body frame or so forth and is non-rotatable.

The stator 22 is fixed to the inner peripheral surface of the motor casing 21. The stator 22 is non-rotatable. The rotor 23 is rotated about the rotational axis O. The rotor 23 is disposed radially inside the stator 22. It should be noted that as described below, the rotational direction of the motor 2 remains unchanged regardless of forward movement and backward movement of the vehicle. Because of this, the motor 2 is rotated only in a forward rotational direction without being rotated in a reverse rotational direction <Torque Converter 3>

The torque converter 3 is disposed at an interval from the motor 2 in the axial direction. The power output part 4 is disposed between the torque converter 3 and the motor 2. The motor 2, the power output part 4 and the torque converter 3 are axially aligned in this order.

The rotational axis O of the torque converter 3 is substantially matched with that of the motor 2. The torque converter 3 is a device to which power, outputted from the motor 2, is inputted. Then, the torque converter 3 amplifies the power (torque) inputted thereto from the motor 2, and outputs the amplified power to the power output part 4.

Figure 2:
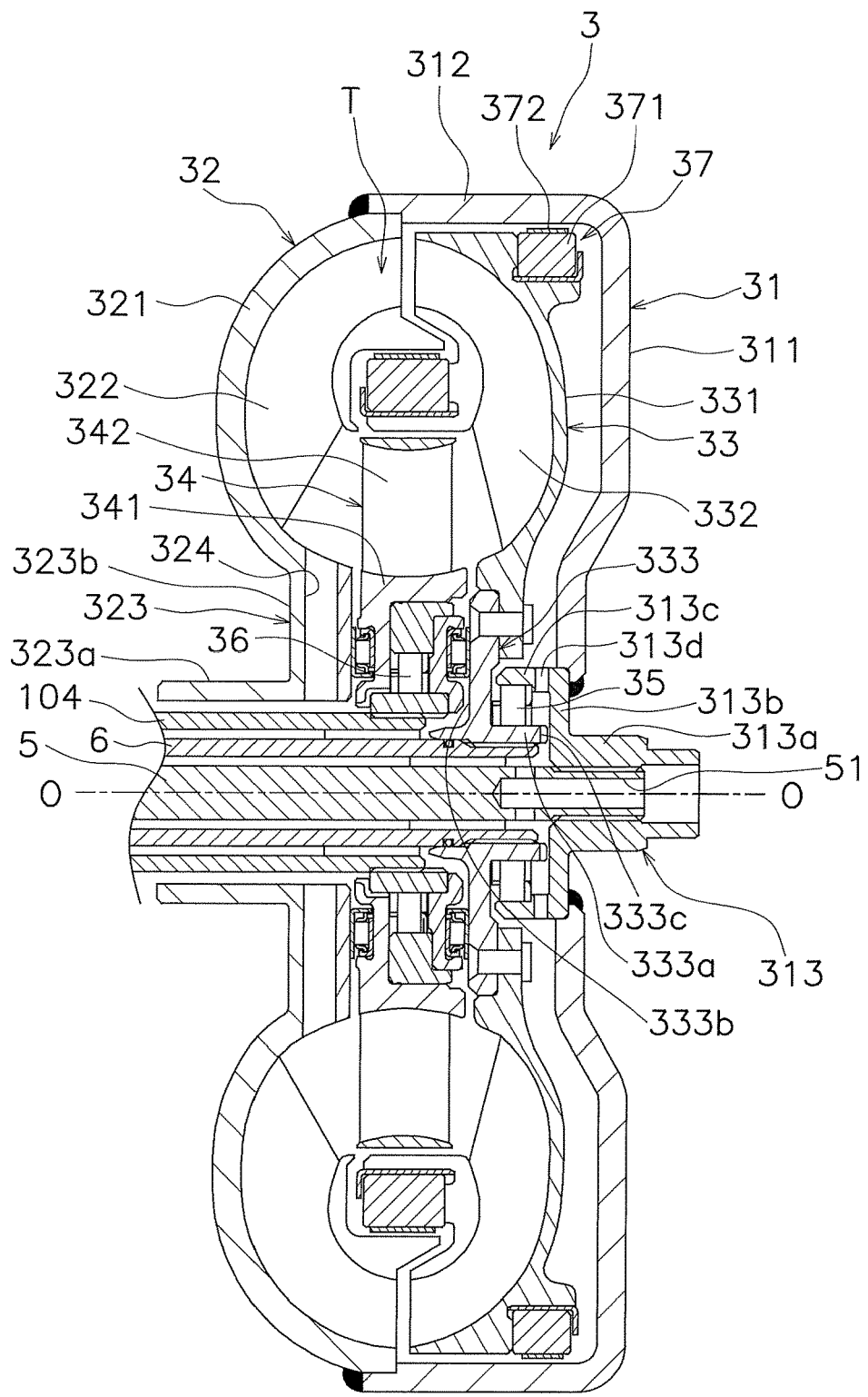
FIG. 2 is a cross-sectional view of a torque converter.

As shown in FIG. 2, the torque converter 3 includes a cover 31, an impeller 32, a turbine 33, a stator 34 and a one-way clutch 36. Besides, the torque converter 3 further includes a centrifugal clutch 37.

The torque converter 3 is disposed such that the impeller 32 faces the motor 2 (the left side in FIG. 2) whereas the cover 31 faces opposite to the motor 2 (the right side in FIG. 2). The torque converter 3 is accommodated in the interior of the torque converter casing 7. Hydraulic fluid is supplied to the interior of the torque converter 3. The hydraulic fluid is, for instance, hydraulic oil.

The cover 31 is a component to which the power, outputted from the motor 2, is inputted. The cover 31 is rotated by the power inputted thereto from the motor 2. The cover 31 is fixed to the input shaft 5 extending from the motor 2. For example, the cover 31 includes a spline hole to which the input shaft 5 is spline-coupled. Because of this, the cover 31 is unitarily rotated with the input shaft 5. The cover 31 is disposed to cover the turbine 33.

The cover 31 includes a disc portion 311, a cylindrical portion 312 and a cover hub 313. The disc portion 311 includes an opening in the middle thereof. The cylindrical portion 312 extends from the outer peripheral end of the disc portion 311 toward the motor 2. The disc portion 311 and the cylindrical portion 312 are provided as a single member.

The cover hub 313 is fixed to the inner peripheral end of the disc portion 311. In the present preferred embodiment, the cover hub 313 is provided as a member separated from the disc portion 311. However, the cover hub 313 can be provided together with the disc portion 311 as a single member.

The cover hub 313 includes a first boss portion 313a, a first flange portion 313b and a protruding portion 313c. The first boss portion 313a, the first flange portion 313b and the protruding portion 313c are provided as a single member.

The first boss portion 313a is made in the shape of a cylinder including a spline hole. The input shaft 5 is spline-coupled to the first boss portion 313a. The first boss portion 313a is rotatably supported by the torque converter casing 7 through a bearing member 102. Because of this, the first boss portion 313a axially extends from the first flange portion 313b to the opposite side of the motor 2.

The first flange portion 313b extends radially outward from the first boss portion 313a. Detailedly, the first flange portion 313b extends radially outward from the motor 2—side end of the first boss portion 313a. The disc portion 311 is fixed to the outer peripheral end of the first flange portion 313b.

The protruding portion 313c axially extends from the first flange portion 313b. The protruding portion 313c extends toward the motor 2. The protruding portion 313c extends from the outer peripheral end of the first flange portion 313b. The protruding portion 313c has a cylindrical shape. The protruding portion 313c includes a plurality of through holes 313d. The hydraulic fluid is discharged from the torque converter 3 through the through holes 313d.

The impeller 32 is rotated unitarily with the cover 31. The impeller 32 is fixed to the cover 31. The impeller 32 includes an impeller shell 321, a plurality of impeller blades 322, an impeller hub 323 and a plurality of supply flow pathways 324.

The impeller shell 321 is fixed to the cover 31. The plural impeller blades 322 are attached to the inner surface of the impeller shell 321.

The impeller hub 323 is attached to the inner peripheral end of the impeller shell 321. It should be noted that in the present preferred embodiment, the impeller hub 323 is provided together with the impeller shell 321 as a single member but can be provided as a member separated from the impeller shell 321.

The impeller hub 323 includes a second boss portion 323a and a second flange portion 323b. The second boss portion 323a has a cylindrical shape and axially extends. The second boss portion 323a is rotatably supported by the torque converter casing 7 through a bearing member 103 (see FIG. 8). A stationary shaft 104 axially extends in the interior of the second boss portion 323a. It should be noted that the stationary shaft 104 has a cylindrical shape and the output shaft 6 axially extends in the interior of the stationary shaft 104. Besides, the stationary shaft 104 extends from, for instance, a transmission casing 40 or the torque converter casing 7. The stationary shaft 104 is non-rotatable.

The supply flow pathways 324 are provided in the impeller hub 323. Detailedly, the supply flow pathways 324 are provided in the second flange portion 323b. The supply flow pathways 324 extend radially outward from the inner peripheral surface of the impeller hub 323. Additionally, the supply flow pathways 324 are opened to the interior of a torus T. It should be noted that the torus T is a space enclosed by the impeller 32 and the turbine 33.

Figure 3:
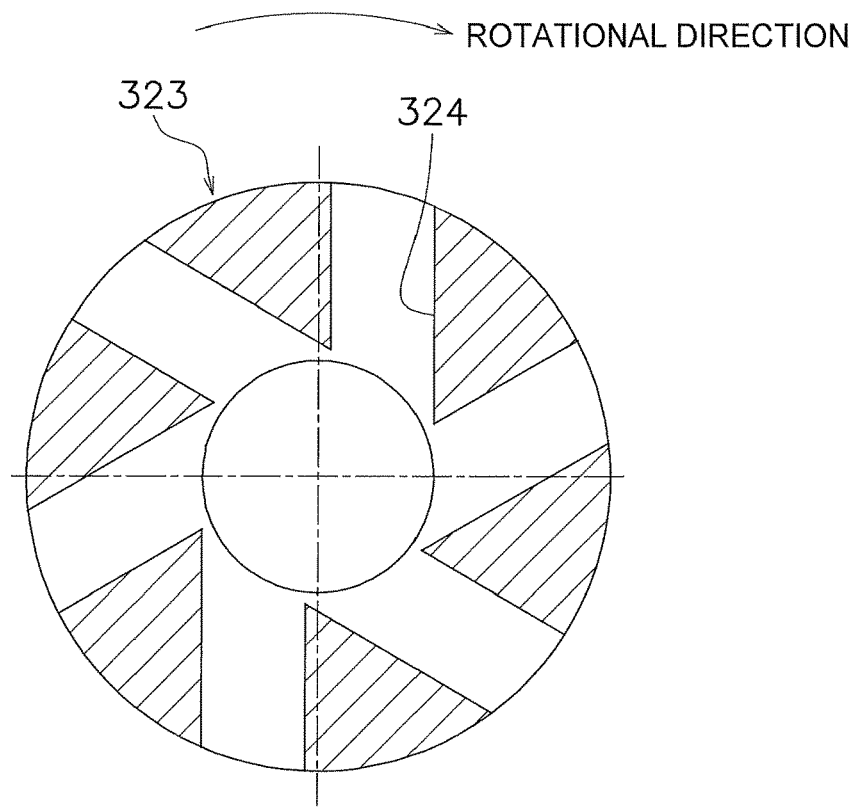
FIG. 3 is a cross-sectional view of a type of impeller hub.
Figure 4:
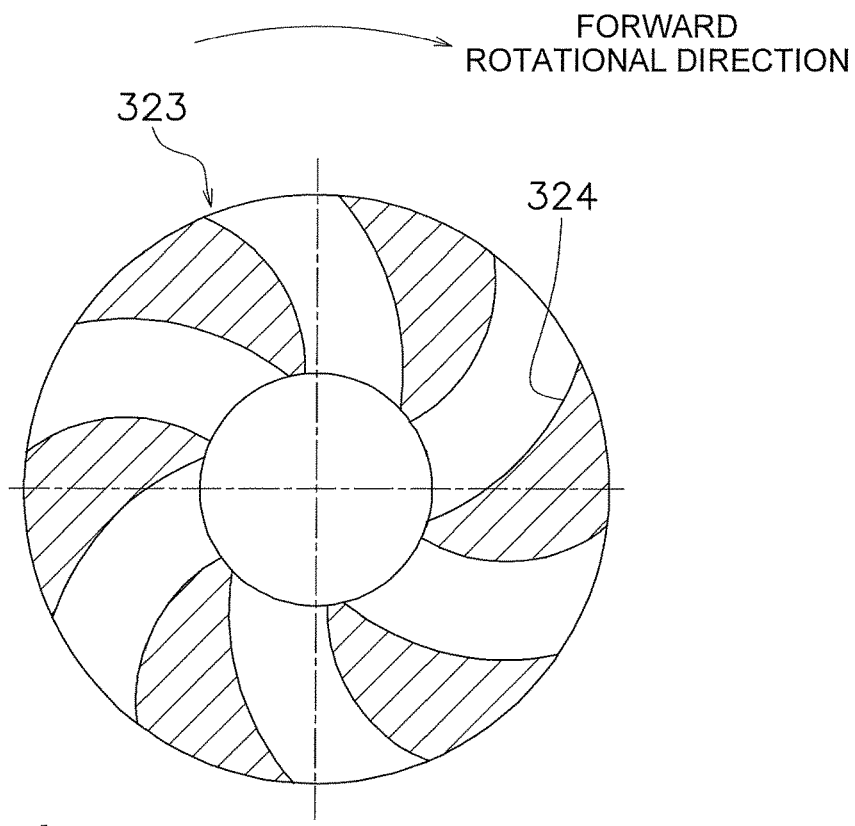
FIG. 4 is a cross-sectional view of another type of impeller hub.

The supply flow pathways 324 are axially closed. In other words, the supply flow pathways 324 are through holes radially extending in the impeller hub 323. As shown in FIG. 3, the supply flow pathways 324 extend in a radial shape. The supply flow pathways 324 slant opposite to the rotational direction, while extending radially outward. It should be noted that the extending shape of each supply flow pathway 324 is not limited to a straight shape. For example, as shown in FIG. 4, each supply flow pathway 324 can extend in a curved shape.

As shown in FIG. 2, the turbine 33 is disposed in opposition to the impeller 32. Detailedly, the turbine 33 is axially opposed to the impeller 32. The turbine 33 is a component to which power is transmitted from the impeller 32 through the hydraulic fluid.

The turbine 33 includes a turbine shell 331, a plurality of turbine blades 332 and a turbine hub 333. The turbine blades 332 are fixed to the inner surface of the turbine shell 331.

The turbine hub 333 is fixed to the inner peripheral end of the turbine shell 331. For example, the turbine hub 333 is fixed to the turbine shell 331 by at least one rivet. In the present preferred embodiment, the turbine hub 333 is provided as a member separated from the turbine shell 331. However, the turbine hub 333 can be provided together with the turbine shell 331 as a single member.

The output shaft 6 is attached to the turbine hub 333. Detailedly, the output shaft 6 is spline-coupled to the turbine hub 333. The turbine hub 333 is unitarily rotated with the output shaft 6.

The turbine hub 333 includes a third boss portion 333a and a third flange portion 333b. The third boss portion 333a and the third flange portion 333b are provided as a single member.

The third boss portion 333a has a cylindrical shape and includes a spline hole. The output shaft 6 is spline-coupled to the third boss portion 333a. The third boss portion 333a axially extends from the third flange portion 333b to the opposite side of the motor 2. In other words, the third boss portion 333a axially extends from the third flange portion 333b toward the cover hub 313.

The third boss portion 333a is disposed at a radial interval from the protruding portion 313c. In other words, the protruding portion 313c is disposed radially outside the third boss portion 333a. A bearing member 35 is disposed between the third boss portion 333a and the protruding portion 313c. It should be noted that without installation of the bearing member 35, the outer peripheral surface of the third boss portion 333a and the inner peripheral surface of the protruding portion 313c are opposed to each other.

A flow pathway is provided between the cover hub 313 and the distal end of the third boss portion 333a such that the hydraulic fluid flows therethrough. In the present preferred embodiment, the third boss portion 333a is provided with a plurality of cutouts 333c on the distal end thereof. The cutouts 333c radially extend on the distal end of the third boss portion 333a. The hydraulic fluid is discharged from the torque converter 3 through the cutouts 333c and the through holes 313d.

The third flange portion 333b extends radially outward from the third boss portion 333a. Detailedly, the third flange portion 333b extends radially outward from the motor 2—side end of the third boss portion 333a. The turbine shell 331 is fixed to the outer peripheral end of the third flange portion 333b by the at least one rivet or so forth.

The stator 34 is configured to regulate the flow of the hydraulic oil returning from the turbine 33 to the impeller 32. The stator 34 is rotatable about the rotational axis O. For example, the stator 34 is supported by the stationary shaft 104 through the one-way clutch 36. The stator 34 is disposed axially between the impeller 32 and the turbine 33.

The stator 34 includes a stator carrier 341 having a disc shape and a plurality of stator blades 342 attached to the outer peripheral surface of the stator carrier 341.

The one-way clutch 36 is disposed between the stationary shaft 104 and the stator 34. The one-way clutch 36 is configured to make the stator 34 rotatable in the forward rotational direction. By contrast, the one-way clutch 36 makes the stator 34 non-rotatable in the reverse rotational direction. The power (torque) is transmitted from the impeller 32 to the turbine 33, while being amplified by the stator 34.

The centrifugal clutch 37 is attached to the turbine 33. The centrifugal clutch 37 is unitarily rotated with the turbine 33. The centrifugal clutch 37 is configured to couple the cover 31 and the turbine 33 to each other by a centrifugal force generated in rotation of the turbine 33. Detailedly, the centrifugal clutch 37 is configured to transmit the power from the cover 31 to the turbine 33 when the rotational speed of the turbine 33 becomes greater than or equal to a predetermined value.

The centrifugal clutch 37 includes a plurality of centrifugal elements 371 and a plurality of friction materials 372. The friction materials 372 are attached to the outer peripheral surfaces of the centrifugal elements 371, respectively. The centrifugal elements 371 are disposed while being radially movable. It should be noted that the centrifugal elements 371 are disposed while being circumferentially immovable. Because of this, the centrifugal elements 371 are rotated together with the turbine 33 and are moved radially outward by centrifugal forces.

When the rotational speed of the turbine 33 becomes greater than or equal to the predetermined value, the centrifugal clutch 37 is configured such that the centrifugal elements 371 are moved radially outward and the friction materials 372 are engaged by friction with the inner peripheral surface of the cylindrical portion 312 of the cover 31. As a result, the centrifugal clutch 37 is turned to an on state, and the power inputted to the cover 31 is transmitted therefrom to the turbine 33 through the centrifugal clutch 37. It should be noted that even when the centrifugal clutch 37 is turned to the on state, the hydraulic fluid is capable of flowing through the centrifugal clutch 37.

When the rotational speed of the turbine 33 becomes less than the predetermined value, the centrifugal elements 371 are moved radially inward, whereby the friction materials 372 and the inner peripheral surface of the cylindrical portion 312 of the cover 31, engaged by friction, are disengaged from each other. As a result, the centrifugal clutch 37 is turned to an off state, and the power inputted to the cover 31 is not transmitted therefrom to the turbine 33 through the centrifugal clutch 37. In other words, the power inputted to the cover 31 is transmitted therefrom to the impeller 32 and is then transmitted to the turbine 33 through the hydraulic fluid.

<Input Shaft 5>

As shown in FIGS. 1 and 2, the input shaft 5 extends from the motor 2. Detailedly, the input shaft 5 extends from the rotor 23 of the motor 2. The input shaft 5 extends toward the torque converter 3. The rotational axis of the input shaft 5 is substantially matched with that of the motor 2 and that of the torque converter 3.

The input shaft 5 inputs the power, outputted from the motor 2, to the torque converter 3. The input shaft 5 is attached at the distal end thereof to the cover hub 313 of the torque converter 3. The input shaft 5 is unitarily rotated with the rotor 23 of the motor 2. The input shaft 5 extends through the interior of the output shaft 6. The input shaft 5 is solid. The input shaft 5 includes a communicating pathway 51 in the distal end thereof. The communicating pathway 51 extends in the axial direction. Besides, the communicating pathway 51 is opened toward the first cooling flow pathway 9a.

<Output Shaft 6>

The output shaft 6 outputs the power inputted thereto from the torque converter 3. The output shaft 6 outputs the power, inputted thereto from the torque converter 3, to the power output part 4. The output shaft 6 extends from the torque converter 3 toward the motor 2.

The output shaft 6 has a cylindrical shape. The input shaft 5 extends through the interior of the output shaft 6. The output shaft 6 is attached at one end (the right end in FIG. 2) to the turbine 33 of the torque converter 3. On the other hand, the output shaft 6 is rotatably supported at the other end, for instance, by the transmission casing 40 through a bearing member and so forth.

<Power Output Part 4>

As shown in FIG. 1, the power output part 4 is disposed axially between the motor 2 and the torque converter 3. The power output part 4 is accommodated in the interior of the transmission casing 40. The power output part 4 outputs the power, inputted thereto from the torque converter 3, toward the drive wheels 101. Detailedly, the power output part 4 outputs the power, inputted thereto from the torque converter 3, to the drive wheels 101 through a differential gear 109. It should be noted that as described below, the power output part 4 does not output the power in a neutral mode.

Figure 5:
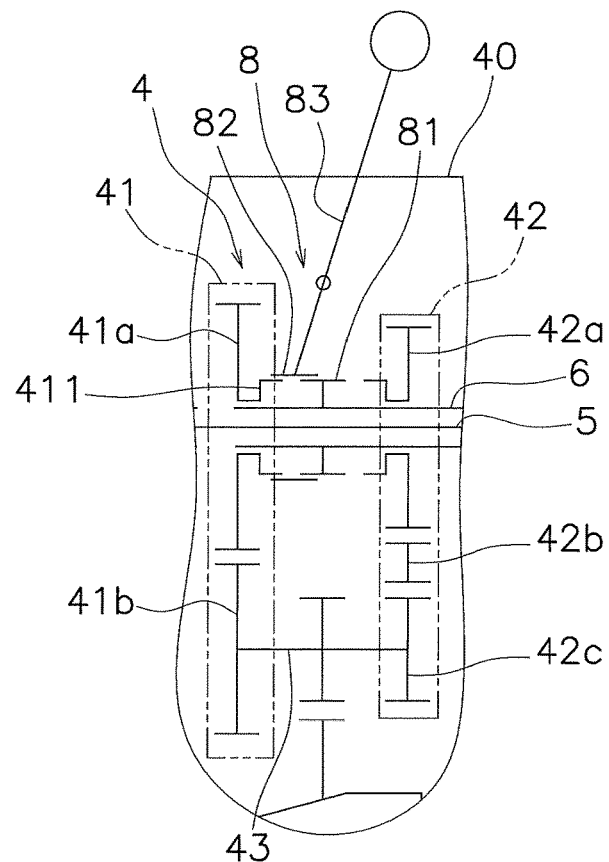
FIG. 5 is a close-up view of a power output part.

As shown in FIG. 5, the power output part 4 includes a first gear train 41 and a second gear train 42. The power output part 4 outputs power therefrom through either the first gear train 41 or the second gear train 42. The first gear train 41 outputs power, inputted to the power output part 4 from the torque converter 3, in a first rotational direction. The second gear train 42 outputs the power, inputted to the power output part 4 from the torque converter 3, in a second rotational direction. The second rotational direction is a rotational direction reverse to the first rotational direction.

The first rotational direction is a rotational direction corresponding to forward movement of the vehicle. The second rotational direction is a rotational direction corresponding to backward movement of the vehicle. Because of this, when the power is transmitted to the drive wheels 101 through the first gear train 41, the vehicle is moved forward. By contrast, when the power is transmitted to the drive wheels 101 through the second gear train 42, the vehicle is moved backward.

The first gear train 41 includes a first gear 41a and a second gear 41b that are meshed with each other. The first gear 41a is supported by the output shaft 6, while being rotatable relative thereto. When a ring gear 82 of the switch mechanism 8 (to be described) is meshed with the first gear 41a, the first gear 41a is unitarily rotated with the output shaft 6.

The second gear 41b is supported by a drive shaft 43. The second gear 41b is unitarily rotated with the drive shaft 43. The second gear 41b outputs the power, inputted thereto from the first gear 41a, to the drive shaft 43.

The second gear train 42 includes a third gear 42a, a fourth gear 42b and a fifth gear 42c. The number of gears in the second gear train 42 is greater by one than that in the first gear train 41. The third gear 42a is supported by the output shaft 6, while being rotatable relative thereto. When the ring gear 82 of the switch mechanism 8 (to be described) is meshed with the third gear 42a, the third gear 42a is unitarily rotated with the output shaft 6.

The fourth gear 42b is meshed with the third gear 42a. The fourth gear 42b is supported by a countershaft (not shown in the drawings). The fourth gear 42b can be rotated unitarily with or relative to the countershaft.

The fifth gear 42c is meshed with the fourth gear 42b. The fifth gear 42c is supported by the drive shaft 43. The fifth gear 42c is unitarily rotated with the drive shaft 43. The fifth gear 42c outputs the power, inputted thereto from the third gear 42a, to the drive shaft 43.

The first gear train 41 has a different gear ratio from the second gear train 42. Detailedly, the second gear train 42 has a higher gear ratio than the first gear train 41.

The power output part 4 can be set to any of a first output mode, a second output mode and a neutral mode. When set in the first output mode, the power output part 4 outputs the power through the first gear train 41. By contrast, when set in the second output mode, the power output part 4 outputs the power through the second gear train 42. On the other hand, when set in the neutral mode, the power output part 4 does not output the power inputted thereto from the torque converter 3.

<Switch Mechanism 8>

The switch mechanism 8 is configured to switch the power output part 4 from one to another among the first output mode, the second output mode and the neutral mode. The switch mechanism 8 includes a clutch hub 81, the ring gear 82 and a lever 83.

The clutch hub 81 is attached to the output shaft 6. The clutch hub 81 is unitarily rotated with the output shaft 6. The clutch hub 81 can be provided together with the output shaft 6 as a single member, or alternatively, can be provided as a member separated from the output shaft 6. The clutch hub 81 includes a plurality of teeth on the outer peripheral surface thereof.

The ring gear 82 includes a plurality of teeth on the inner peripheral surface thereof. The ring gear 82 is constantly meshed with the clutch hub 81 and is unitarily rotated with the clutch hub 81. In other words, the ring gear 82 is unitarily rotated with the output shaft 6. The ring gear 82 is disposed to be movable in the axial direction.

As shown in FIG. 5, the ring gear 82 is meshed with the clutch hub 81 and is also capable of being turned to a state of engagement with the first gear 41a. Detailedly, the first gear 41a includes a first cylindrical portion 411 protruding in the axial direction. The first cylindrical portion 411 includes a plurality of teeth on the outer peripheral surface thereof. The ring gear 82 is herein meshed with the outer peripheral surface of the first cylindrical portion 411.

When the ring gear 82 is meshed with the clutch hub 81 and the first cylindrical portion 411 as described above, the power output part 4 is set to the first output mode. In other words, the power, inputted to the power output part 4 from the output shaft 6, is outputted through the first gear train 41.

Figure 6:
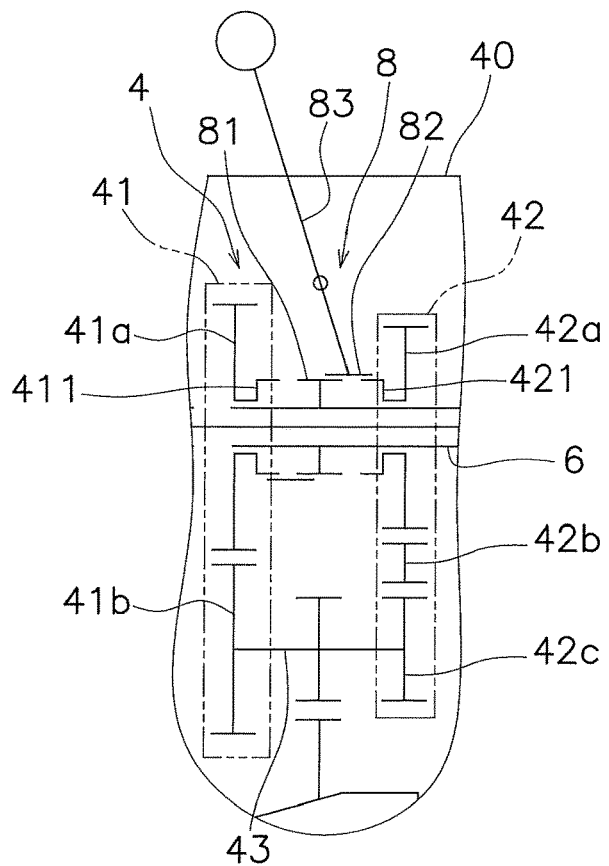
FIG. 6 is a close-up view of the power output part.

As shown in FIG. 6, the ring gear 82 is meshed with the clutch hub 81 and is also capable of being turned to a state of engagement with the third gear 42a. Detailedly, the third gear 42a includes a second cylindrical portion 421 extending in the axial direction. The second cylindrical portion 421 includes a plurality of teeth on the outer peripheral surface thereof. The ring gear 82 is herein meshed with the outer peripheral surface of the second cylindrical portion 421.

When the ring gear 82 is meshed with the clutch hub 81 and the second cylindrical portion 421 as described above, the power output part 4 is set to the second output mode. In other words, the power, inputted to the power output part 4 from the output shaft 6, is outputted through the second gear train 42.

Figure 7:
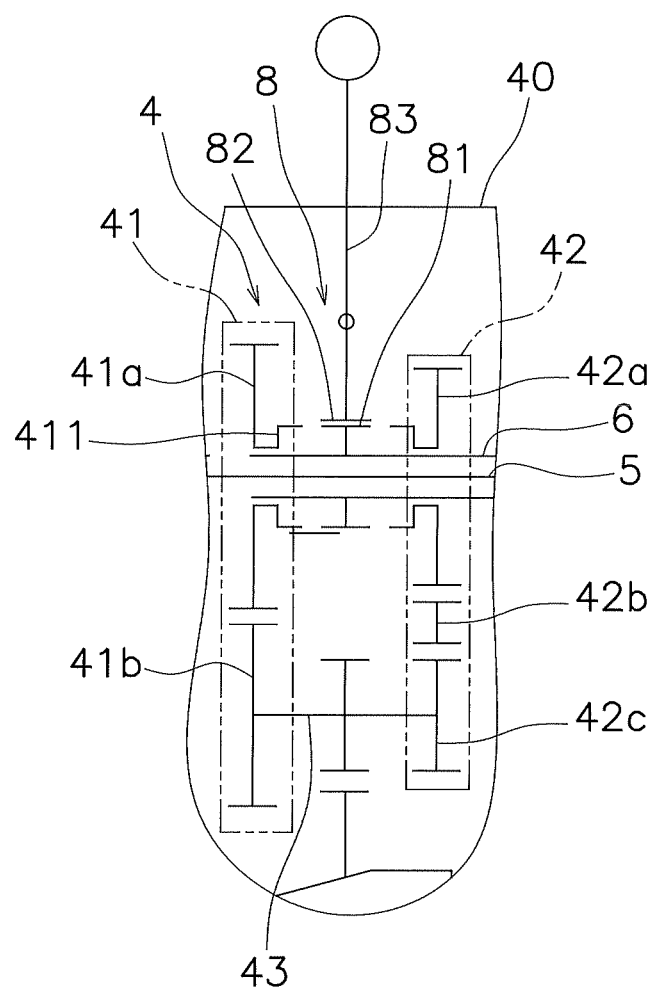
FIG. 7 is a close-up view of the power output part.

As shown in FIG. 7, the ring gear 82 is capable of being turned to a state of meshing with only the clutch hub 81. When the ring gear 82 is meshed with only the clutch hub 81 without being meshed with both the first and second cylindrical portions 411 and 421 as described above, the power output part 4 is set to the neutral mode. In other words, the power, inputted to the power output part 4 from the output shaft 6, is not outputted toward the drive wheels 101.

The lever 83 is coupled to the ring gear 82. The lever 83 extends from the ring gear 82 to the outside of the transmission casing 40. The lever 83 is operated by a driver. The ring gear 82 is axially movable in conjunction with operating the lever 83. The axial movement of the ring gear 82 results in meshing the clutch hub 81 and the first cylindrical portion 411, meshing with the clutch hub 81 and the second cylindrical portion 421, or meshing with only the clutch hub 81. As a result, the switch mechanism 8 enables the power output part 4 to be switched from one to another among the first output mode, the second output mode and the neutral mode.

<Torque Converter Casing 7>

Figure 8:
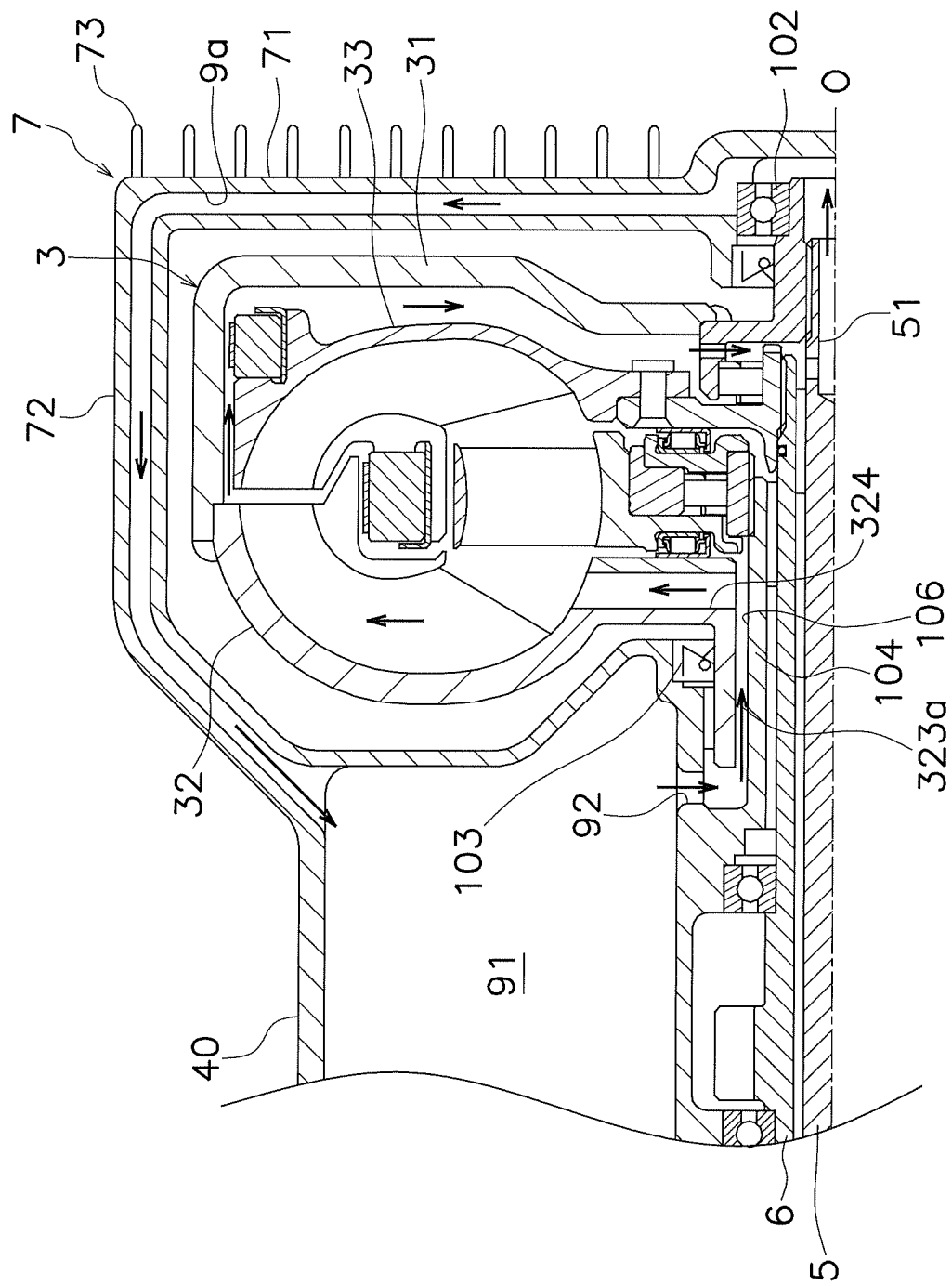
FIG. 8 is a cross-sectional view of the drive unit shown for indicating a first cooling flow pathway.

As shown in FIG. 8, the torque converter casing 7 accommodates the torque converter 3. In the present preferred embodiment, the torque converter casing 7 is provided together with the transmission casing 40 as a single member. However, the torque converter casing 7 can be provided as a member separated from the transmission casing 40.

The torque converter casing 7 includes a side wall portion 71, an outer wall portion 72 and a plurality of heat dissipation fins 73. The sidewall portion 71 is disposed in opposition to the cover 31 of the torque converter 3. The sidewall portion 71 is disposed orthogonal to the rotational axis O.

The torque converter 3 is disposed on one axial side (the left side in FIG. 8) of the sidewall portion 71. On the other hand, the sidewall portion 71 makes contact at the other side (the right lateral surface in FIG. 8) with external air. In other words, a member, functioning as a heat source, is not disposed on the other side of the sidewall portion 71.

The cover 31 is rotatably attached to the middle part of the sidewall portion 71 through the bearing member 102. The sidewall portion 71 is made of a material, having a high specific heat and a high thermal conductivity, so as to quickly absorb a large amount of heat from the hydraulic fluid flowing through the first cooling flow pathway 9a and release the absorbed heat to the atmosphere. For example, the sidewall portion 71 is made of magnesium, aluminum or so forth.

The outer wall portion 72 is disposed in opposition to the outer peripheral surface of the torque converter 3. The outer wall portion 72 is provided together with the sidewall portion 71 as a single member. However, the outer wall portion 72 can be provided as a member separated from the sidewall portion 71. The outer wall portion 72 extends toward the motor 2 from the outer peripheral end of the sidewall portion 71. The outer wall portion 72 extends substantially in parallel to the rotational axis O. It should be noted that the distal end (the motor 2—side end) of the outer wall portion 72 slants radially inward. The outer wall portion 72 can be made of a similar material to the sidewall portion 71.

The heat dissipation fins 73 are provided on the sidewall portion 71. The heat dissipation fins 73 extend from the sidewall portion 71 to the opposite side (rightward in FIG. 8) of the torque converter 3. The heat dissipation fins 73 are attached to the sidewall portion 71 in order to efficiently dissipate the heat of the hydraulic fluid flowing through the first cooling flow pathway 9a. The thermal conductivity of the heat dissipation fins 73 is preferably set to be equivalent to or higher than that of the sidewall portion 71 but is not particularly limited to this setting. The heat dissipation fins 73 are made of, for instance, magnesium, aluminum, copper or so forth.

<First Cooling Flow Pathway 9a>

The first cooling flow pathway 9a is a flow pathway for cooling the hydraulic fluid discharged from the torque converter 3. The first cooling flow pathway 9a extends in the interior of the torque converter casing 7. In the present preferred embodiment, the first cooling flow pathway 9a is provided only in the upper half of the torque converter casing 7.

The first cooling flow pathway 9a extends from the middle part to the outer peripheral part in the interior of the sidewall portion 71 and axially extends therefrom beyond the torque converter 3 in the interior of the outer wall portion 72. The first cooling flow pathway 9a is communicated with a hydraulic fluid sump 91.

Figure 9:
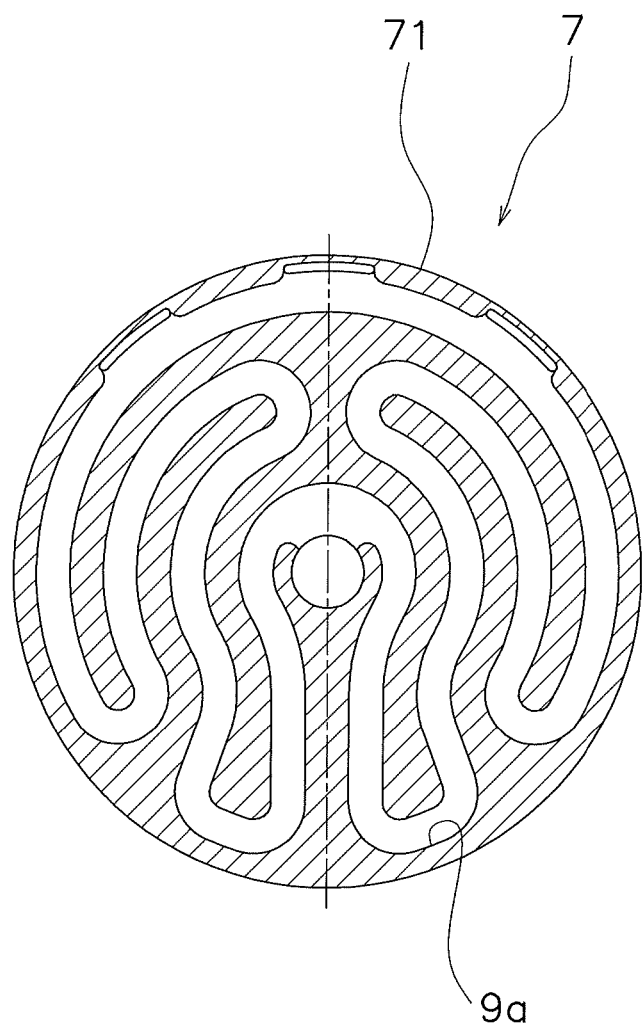
FIG. 9 is a cross-sectional view of a sidewall portion of a torque converter casing.
Figure 10:
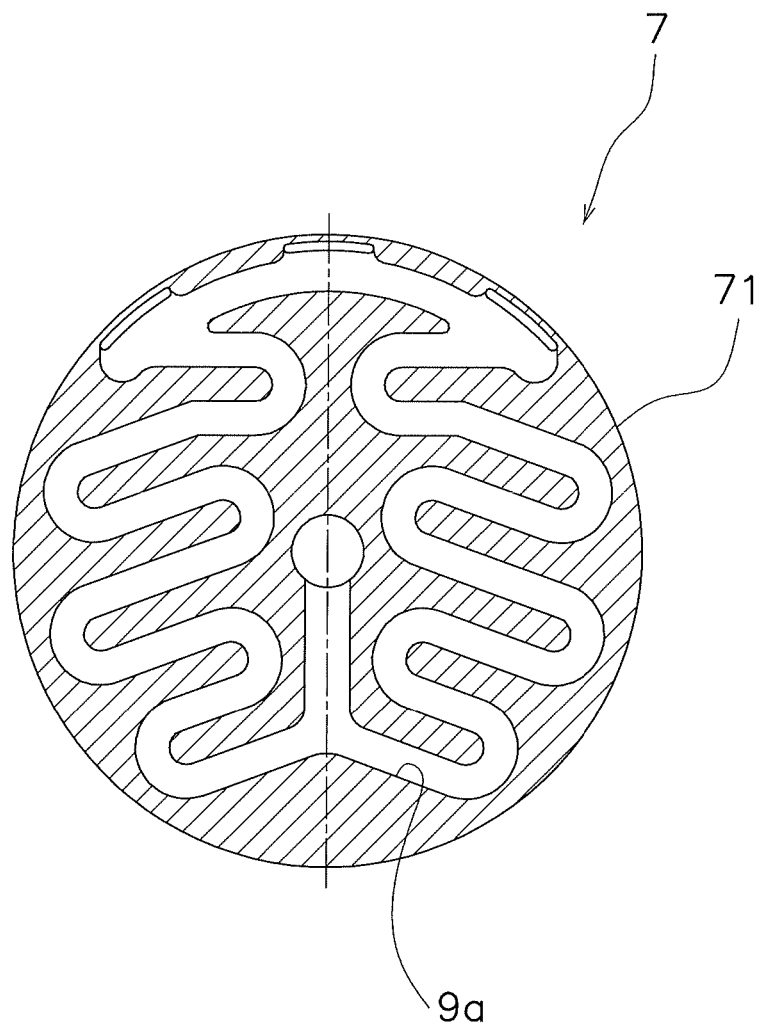
FIG. 10 is a cross-sectional view of the sidewall portion of the torque converter casing.

As shown in FIG. 9 or FIG. 10, the first cooling flow pathway 9a includes a plurality of paths in the interior of the sidewall portion 71. In the present preferred embodiment, the first cooling flow pathway 9a is divided into two paths in the interior of the sidewall portion 71. In the interior of the sidewall portion 71, the first cooling flow pathway 9a extends from the middle part to the outer peripheral part not in a straight shape but in a winding shape.

The first cooling flow pathway 9a can include a plurality of paths in the interior of the outer wall portion 72 as well. In the present preferred embodiment, the first cooling flow pathway 9a is divided into, for instance, three paths in the interior of the outer wall portion 72. The first cooling flow pathway 9a axially extends in a straight shape in the interior of the outer wall portion 72. Alternatively, the first cooling flow pathway 9a can extend in a winding shape in the interior of the outer wall portion 72.

<Hydraulic Fluid Sump 91>

As shown in FIG. 8, the drive unit 100 includes the hydraulic fluid sump 91. The hydraulic fluid sump 91 is disposed to axially interpose the torque converter 3 together with the sidewall portion 71 therebetween. In other words, the hydraulic fluid sump 91, the torque converter 3 and the sidewall portion 71 are axially aligned in this order. The hydraulic fluid sump 91 is disposed in the interior of the transmission casing 40. The hydraulic fluid sump 91 is disposed above the rotational axis O.

The hydraulic fluid sump 91 contains the hydraulic fluid to be supplied to the torque converter 3 in the interior thereof. The hydraulic fluid sump 91 is provided with a supply port 92 in the bottom surface thereof. The hydraulic fluid, discharged from the supply port 92, is supplied to the torque converter 3 through a flow pathway 106 provided between the stationary shaft 104 and the second boss portion 323a of the impeller hub 323.

Specifically, a centrifugal force is generated in rotation of the impeller 32 of the torque converter 3, whereby the hydraulic fluid residing in the interior of the flow pathway 106 is supplied to the interior of the torus T through the supply flow pathways 324. Then, the hydraulic fluid, discharged from the torque converter 3, flows to the first cooling flow pathway 9a through the communicating pathway 51. Subsequently, the hydraulic fluid, cooled while flowing through the first cooling flow pathway 9a, is returned to the hydraulic fluid sump 91.

<Actions>

In the drive unit 100 configured as described above, the power output part 4 is set to the first output mode in forward movement of the vehicle. As a result, power, inputted to the torque converter 3 from the motor 2, is outputted to the drive wheels 101 through the first gear train 41 of the power output part 4. By contrast, the power output part 4 is set to the second output mode in backward movement of the vehicle. As a result, the power, inputted to the torque converter 3 from the motor 2, is outputted to the drive wheels 101 through the second gear train 42 of the power output part 4. Thus, the rotational direction of the motor 2 and that of the torque converter 3 remain unchanged regardless of forward movement and backward movement of the vehicle. Because of this, the drive unit 100 can amplify a torque not only in forward movement but also in backward movement.

[Modifications]

One preferred embodiment of the present invention has been explained above. However, the present invention is not limited to the above, and a variety of changes can be made without departing from the gist of the present invention.

Modification 1

Figure 11:
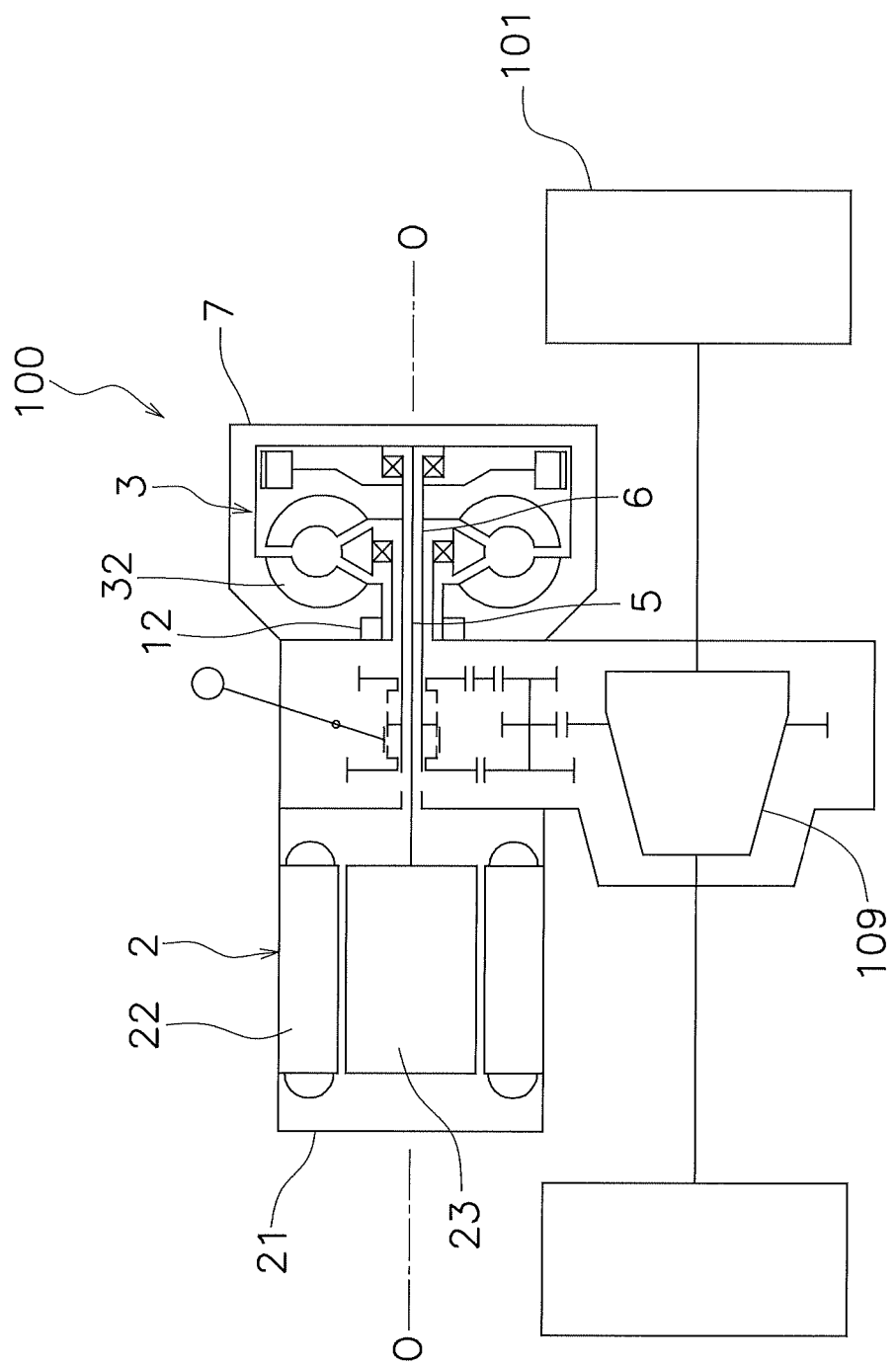
FIG. 11 is a schematic diagram of a drive unit according to a modification.

In the aforementioned preferred embodiment, the impeller 32 includes the supply flow pathways 324. However, the configuration of the impeller 32 is not limited to this. In other words, the impeller 32 may not include the supply flow pathways 324. In this case, as shown in FIG. 11, the drive unit 100 can further include an oil pump 12.

The oil pump 12 is configured to supply oil to the interior of the torque converter 3. The oil pump 12 is unitarily rotated with either the motor 2 or the torque converter 3. Detailedly, the oil pump 12 is attached to the impeller 32 so as to be unitarily rotated therewith. In more detail, the oil pump 12 is attached to the impeller hub 323 of the impeller 32. The oil pump 12 is, for instance, a displacement pump.

Modification 2

In the aforementioned preferred embodiment, the switch mechanism 8 switches the power output part 4 among modes in conjunction with operating the lever 83. However, the configuration of the switch mechanism 8 is not limited to this. For example, the switch mechanism 8 can be also configured to switch the power output part 4 among modes by electronic control or so forth.

Modification 3

Figure 12:
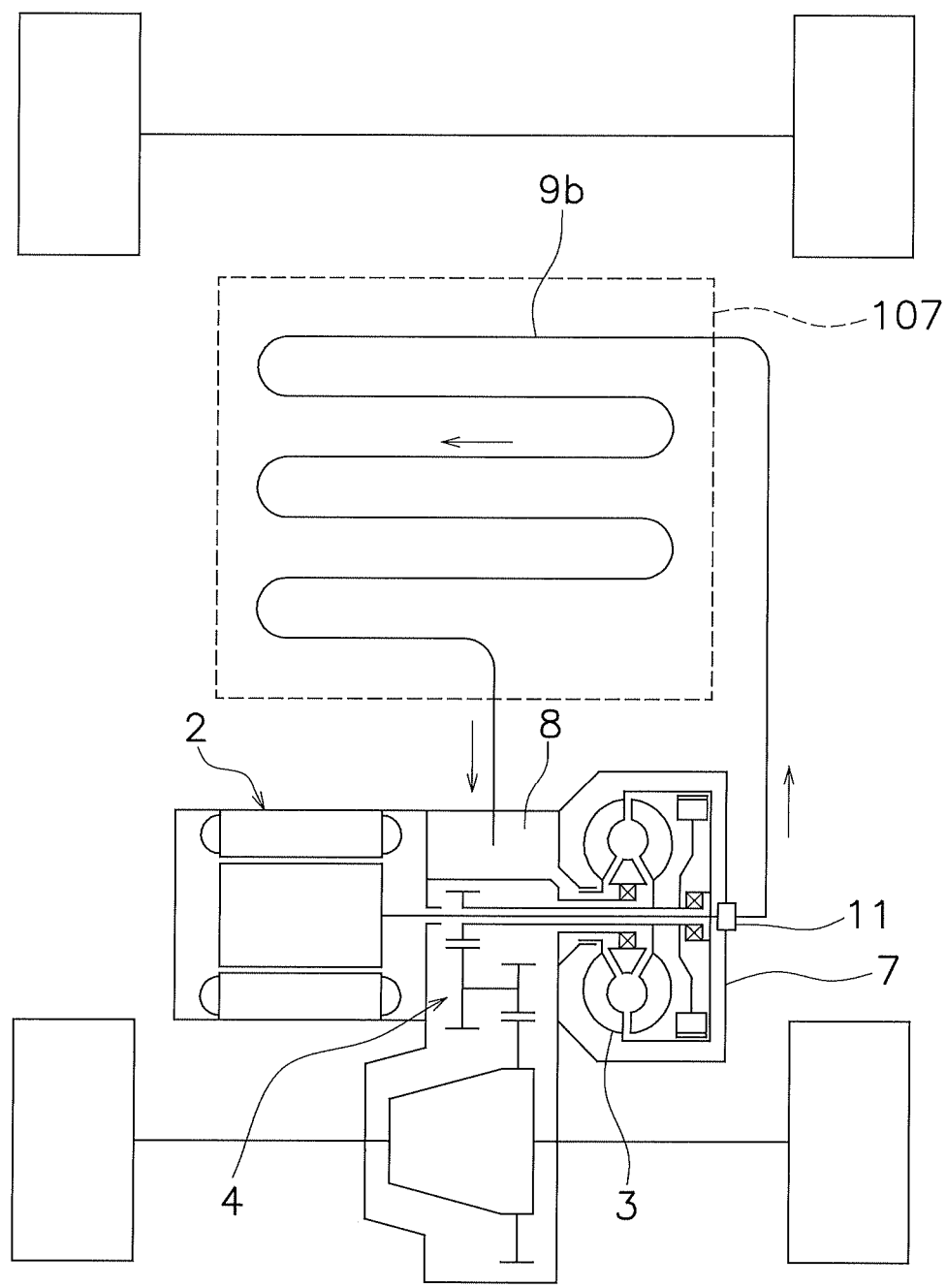
FIG. 12 is a schematic diagram of a drive unit according to another modification.

As shown in FIG. 12, the torque converter unit may further include a second cooling flow pathway 9b. The second cooling flow pathway 9b extends through the interior of a compartment 107 of a vehicle into which the torque converter unit is installed. The hydraulic fluid, discharged from the torque converter 3, flows through the second cooling flow pathway 9b. The hydraulic fluid, flowing through the second cooling flow pathway 9b, is cooled while dissipating heat thereof into the compartment 107.

The hydraulic fluid is supplied to the second cooling flow pathway 9b from the communicating pathway 51. Additionally, the hydraulic fluid is returned to the hydraulic fluid sump 91 through the second cooling flow pathway 9b.

The torque converter unit further includes a selector mechanism 11. The selector mechanism 11 is configured to select either the first cooling flow pathway 9a or the second cooling flow pathway 9b as a cooling flow pathway for supplying the hydraulic fluid discharged from the torque converter 3.

Modification 4

In the aforementioned preferred embodiment, the second gear train 42 is composed of gears that the number thereof is greater by one than that in the first gear train 41. However, the configuration of the second gear train 42 is not limited to this. For example, the second gear train 42 can be composed of gears that the number thereof is less by one than that in the first gear train 41.

REFERENCE SIGNS LIST

2 Motor
3 Torque converter
4 Power output part
41 First gear train
42 Second gear train
8 Switch mechanism
12 Oil pump
100 Drive unit

What is claimed is:

1. A drive unit for driving a drive wheel, the drive unit comprising:
   a motor configured to rotate forwardly and backwardly;
   a torque converter to which a power is inputted from the motor; and
   a power output part configured to output the power inputted thereto from the torque converter to the drive wheel, wherein
   the power output part includes a first gear train and a second gear train, the first gear train configured to output the power inputted to the power output part from the torque converter in a first rotational direction in a state where the motor is forwardly rotated, the second gear train configured to output the power inputted to the power output part from the torque converter in a second rotational direction with keeping the state where the motor is forwardly rotated, the second rotational direction being reverse to the first rotational direction.

2. The drive unit according to claim 1, wherein the first gear train has a different gear ratio from the second gear train.

3. The drive unit according to claim 1, wherein the power output part is configured to be set to one of a first output mode, a second output mode and a neutral mode, the power output part further configured to output the power through the first gear train in the first output mode, the power output part further configured to output the power through the second gear train in the second output mode, the power output part prevented from outputting the power inputted thereto from the torque converter in the neutral mode.

4. The drive unit according to claim 3, further comprising:
   a switch mechanism configured to switch the power output part from one to another among the first output mode, the second output mode and the neutral mode.

5. The drive unit according to claim 1, further comprising:
   an oil pump unitarily rotated with either the motor or the torque converter.

6. The drive unit according to claim 1, further comprising:
   an output shaft configured to output the power from the torque converter, the output shaft having a common axis to the torque converter; and
   a switch mechanism configured to switch modes of the power output part, wherein
   the switch mechanism is attached to the output shaft.

* * * * *